Oct. 30, 1962  C. A. TOCE ETAL  3,061,662
ELECTRIC STORAGE BATTERY
Filed July 1, 1959  2 Sheets-Sheet 1
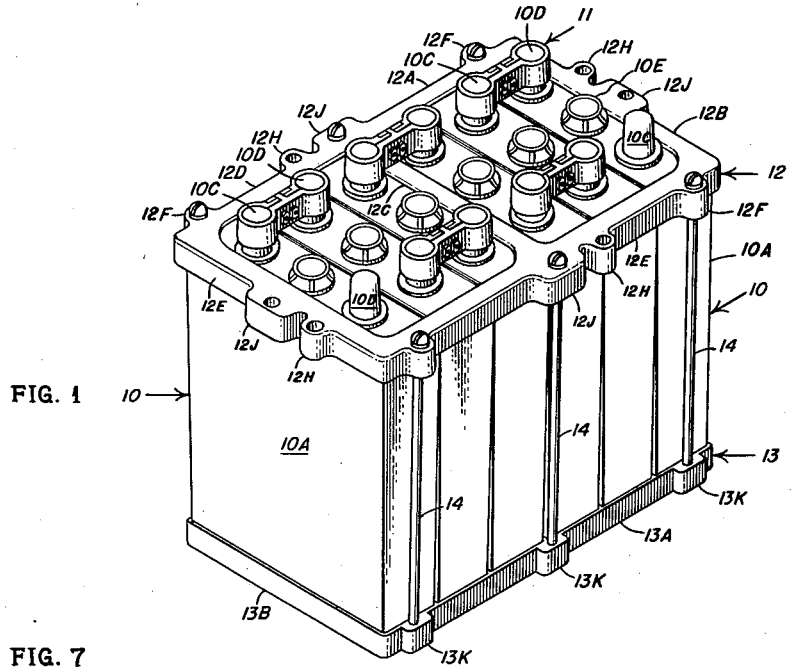
FIG. 1
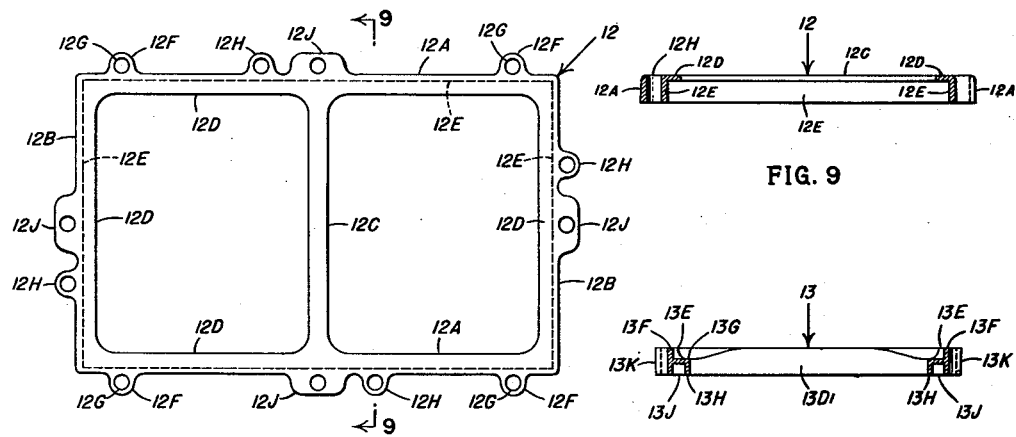
FIG. 7
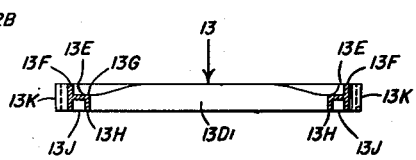
FIG. 9
FIG. 10
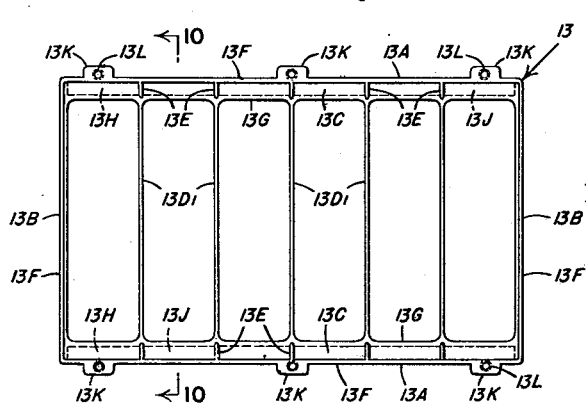
FIG. 8
Inventors:
Robert Broussard
Charles A. Toce
By *John Howard Joy*
their Attorney Oct. 30, 1962     C. A. TOCE ETAL     3,061,662
ELECTRIC STORAGE BATTERY
Filed July 1, 1959                             2 Sheets-Sheet 2

Inventors:
Robert Broussard
Charles A. Toce
By *[signature]*
their Attorney

United States Patent Office 3,061,662
Patented Oct. 30, 1962

3,061,662
ELECTRIC STORAGE BATTERY
Charles A. Toce, Sunland, and Robert Broussard, Glendale, Calif., assignors to Electro-Acid Corporation, a corporation of Nevada
Filed July 1, 1959, Ser. No. 824,407
3 Claims. (Cl. 136—166)

Our invention, relating generally to electric storage batteries, is more particularly concerned with a multi-cell electric storage battery in which the several cell units are physically separate and independent of each other, making up a composite battery of multi-cell units, removably secured together.

An object of our invention is to provide an electric storage battery which, employing a multiplicity of separate and independent cell units, lends itself to ready repair by early replacement of any defective cell unit and this without sacrifice of those units which remain operable; which battery is simple in construction and assembly and is effective and economical in operation, displaying long useful life coupled with nearly fool-proof maintenance; which remains cool under the most exacting and prolonged load demands, without tendency to overheat, froth, or lose electrolyte; which is low in cost, ready of manufacture and requires stockpiling of but a minimum number of component elements with minimum requirement of space therefor, thus involving low investment both in initial manufacture, in subsequent jobbing, and in stockpiling on the shelves of the retail distributor.

Another object is to provide an inexpensive, composite battery structure of the type described, which displays high resistance both to acid attack and to rust formation; and in which the several parts may be readily dismantled with minimum effort, even after prolonged years of heavy-duty service, followed by ready replacement of a defective cell unit by a fresh one.

A further object is to provide an electric storage battery, with a desired flexibility of shape, voltage and output rating, and this through the provision of top and bottom frames having several different shapes and configurations, all formed from plastic or other suitable material displaying requisite characteristics of hardness, rigidity and strength.

All the objects and advantages recited in the foregoing, as well as many others, highly practical in nature, attend the practice of our invention. Other objects and advantages will be pointed out more fully during the course of the following description, particular reference being had in this connection, to the several sheets of drawings which form part of this application.

Thus, our invention resides in the several parts and elements, in the shaping, dimensioning and contouring of these parts and elements, in the several materials of construction, in the assembly of those parts and elements, and in both the combination and relation of each of the same with respect to one or more of the others, the scope of the application of all of which is more fully set forth in the claims at the end of this specification.

In the several views of the drawings, wherein we disclose our illustrative embodiment of our invention:

FIG. 1 is a perspective view of our assembled battery;

Figure 2:
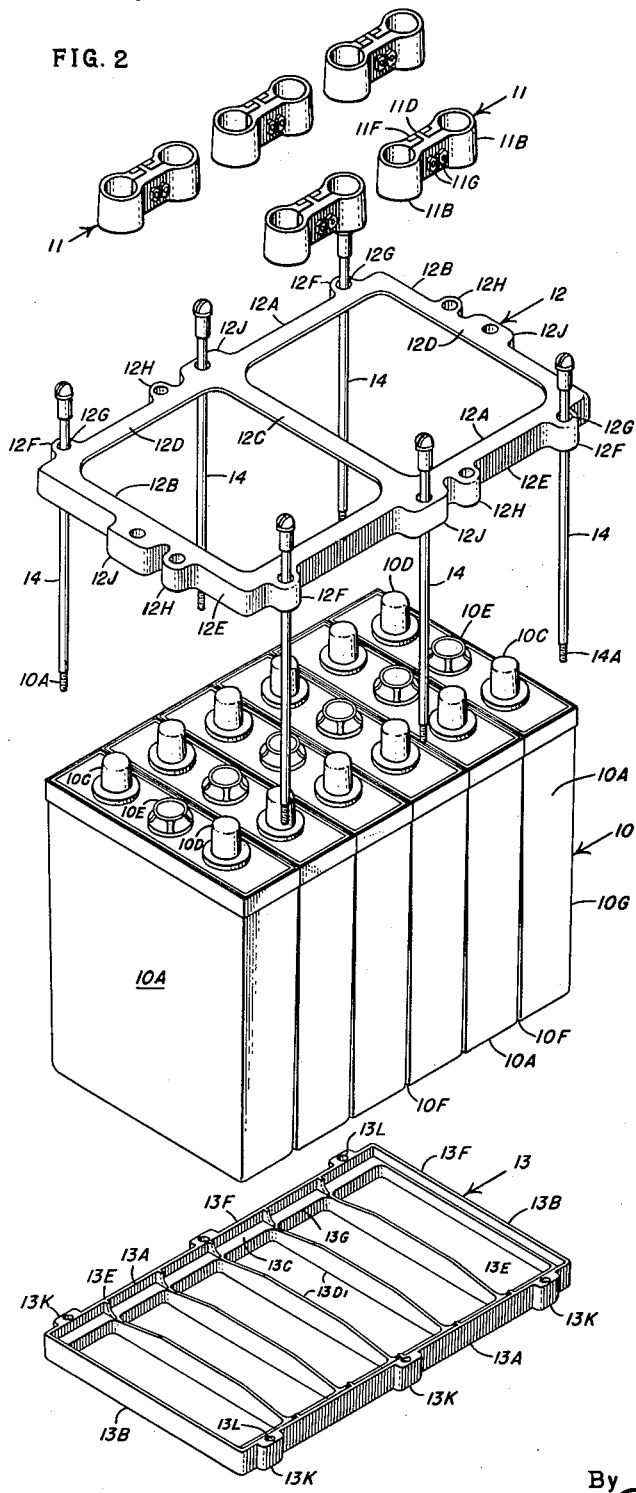
FIG. 2 is an exploded perspective view, showing the relation of the component parts of the battery before assembly.
Figure 3:
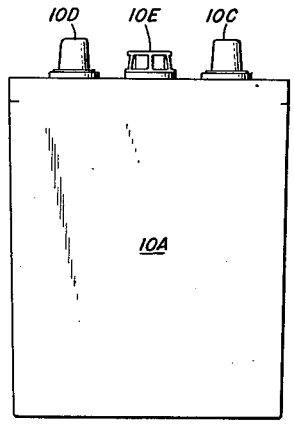
FIG. 3 is a side elevation view of a single storage cell, as used in our battery.
Figure 4:
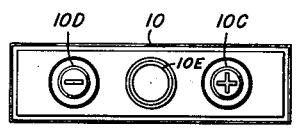
FIGS. 4 and 5 are respectively a top plan view and a bottom plan view of the cell shown in FIG. 3.
Figure 5:
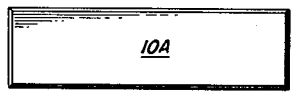

FIGS. 7 and 8 are respectively a plan view of the top and bottom frame members of the battery; while FIGS. 9 and 10 respectively are transverse sections of the top frame member, taken on the line 9—9 of FIG. 7 and of the bottom frame member, taken on the line 10—10 of FIG. 8.

Throughout the several views of the drawings, like reference characters denote like structural parts.

For a more ready understanding of our invention attention is called to certain comparatively recent developments in the electric storage battery art. Thus, nearly all passenger and/or cargo carrying mobile equipment is now supplied with electric storage batteries for one purpose or another. And to greater and greater extent, tendency is directed towards the provision of multi-celled batteries of high rating, both as to voltage and output. Of course high voltages necessitate batteries having a large number of cells. And similarly, a high current output requires either the operation of a number of cells of the usual capacity, parallel-connected for required current delivery at rated voltage, or the provision of fewer cells, the output of which is increased through using either a greater number of plates than ordinarily employed, or plates of larger size, or both. In any case, it is apparent that upon failure of any one or several of the active cells at any time and from any cause, the entire battery suffers immediate loss in efficiency and, in fact, becomes incapable of performing its intended task.

Another aspect of battery operation, with modern compact equipment now required in practical usage, is the tendency to overheat. Particularly is this encountered in the modern automobile, wherein the motor and its various auxiliaries consume practically all space available under the hood. Moreover, the constantly increasing demand made upon the battery, both for initially turning over the motor and thereafter for servicing the many auxiliaries found on the present day automobile contribute materially to the overall problem, and this under comparatively poor ventilating conditions. Overheating, with its resulting and attendant frothing of the electrolyte, is attended not only by damage to the battery as evidenced by drastic curtail in its effective life, buckling of cell plates and the like, but as well by damage to those surrounding parts of the motor structure, car frame, etc. which are disposed under the hood and in the neighborhood of the battery.

A further problem arises from the many types of highly divergent service requirements of the present day, this as a demand for an almost equal variety of sizes and types of batteries. And it has heretofore been necessary to stock such a variety of sizes and shapes of batteries. For the batteries heretofore available possess little flexibility, either in initial construction or in their subsequent adaptability to varied service demands. Problems of stocking a large number of batteries and the relatively slow turnover are encountered.

An important object of our invention is to provide a highly flexible battery which, of low investment in stockpiling and low cost in service maintenance, can be readily fabricated of separate cell units into a battery of a size, configuration and rating corresponding to the service demand. A further object is to provide a battery which can be readily and inexpensively assembled, and thereupon made fast to the battery mounting, and in which a spent or defective cell unit can be readily replaced by a fresh cell unit, all with minimum disturbance of the remaining parts of the battery. Another object is to provide a battery in which the several cell units function at efficient operating temperatures, even while satisfying prolonged heavy duty demand in confined quarters.

And now referring more particularly to the practice of our invention attention is directed to the disclosure of the several views of the drawings, especially to the exploded view according to the FIG. 2. It will be seen that we provide a plurality of separate, like active battery cell units, indicated generally at 19. Each battery comprises a casing 10A, a cover 10B, positive and negative terminals 10C and 10D, and cell filler caps 10E. The casing 10A and cover 10B are formed of suitable materials displaying enduring operating characteristics under prolonged heavy duty operation. Polystyrene responds admirably to these requirements.

It is further to be noted that, both for convenience in relating the several cell units to each other, both in original assembly and upon removal and replacement, we provide inward taper to the vertical sides and ends of the casings 10A, towards the bottoms thereof, as best indicated at 10F in FIG. 2. The taper thus imparted ensures an ease of handling the cell units during operation. In addition, this ensures an adequate supply of air flow between and along the sides of the active cell units. Effective dissipation of evolved heat is thereby provided through the circulation of ventilating air thus obtained. The several cell units have conventional plates, separators, mounting grids and the like.

Terminal connectors, indicated generally at 11 in FIGS. 2 and 6 and later to be described as to the details of construction thereof, serve to interconnect the terminal posts of desired polarity. By properly connecting these posts, a battery is assembled of requisite voltage and current rating. Usually, with a series connection of the cell units, the units 10 are arranged with terminal posts of unlike polarity disposed side by side. Thus, referring to the rightmost two cell units 10 in FIG. 2, the plus terminal post 10C of the rightmost unit 10 is connected by connector 11 with the adjacent negative terminal post 10D of cell unit 10 disposed immediately to its left.

The cell units 10 (see FIG. 1) are mounted in a suitable dismantleable frame so that the several cell units of which the composite battery is comprised are firmly retained in position, as a complete battery assembly. More particularly, we provide top and bottom frames 12 and 13, respectively (FIG. 2), which embrace the cell units. Frames 12 and 13 are preferably formed of desired suitable and readily available moldable material which, in finished construction, displays requisite qualities of hardness, rigidity, strength both in shear and in compression, and which is relatively resistant to attack by battery acids or to rust. Polystyrene lends itself splendidly to these requirements. And this relatively inexpensive material is readily formed to desired intricate patterns, as by die-molding under conditions of high pressure.

As perhaps best evident from FIG. 9, the top frame 12 is of an angle-like or generally L-shaped cross-section, this configuration lending itself readily to facility in molding while imparting requisite physical strength to the finished product. Moreover, top frame 12 is of a web-like, rectangular configuration as perhaps best shown in FIGS. 1, 2 and 7.

Top frame 12 comprises elongated side members 12A, 12A, connected by transverse end members 12B, 12B. And as well, in the construction shown the side members 12A, 12A are further interconnected, intermediate their length, by web members 12C. We find the particular configuration of frame 12 to be best suited for the conventional 12-volt battery as now ordinarily used in automobile service, employing, of course, six cells. But of course, the external configuration and dimensioning of the top frame 12 can be readily adapted to the particular battery for which it is intended. Thus, it may be compacted to handle three cell units placed side by side, to provide a 6-volt battery. Or the cell units may be placed, say, in three sets end-to-end, each set comprising either a single cell unit, as for a 6-volt battery, or a pair of cell units disposed side-by-side, as for a 12-volt rating. A number of combinations of active cell units can be readily provided. And it is sufficient ordinarily, only to stock the cell units themselves, together with four or five different sizes and shapes of top and bottom frames 12 and 13.

The top frame 12 fits nicely over and about the assembled and jumper-interconnected cell units 10, in snugly encompassing manner. And this is accomplished by providing the side members 12A and the end members 12B both with laterally extending lip portions 12D, which during ordinary usage are oriented in horizontal plane, and with short vertical lip portions 12E. These vertical lip portions skirt snugly down over the cover members 12B of the assembled cell units, closely encompassing the tops of the assembled cell units. The flat web 12C interconnects sides 12A, 12A and, in assembly, extends centrally across and rests upon the tops of the cell units (see FIG. 1).

For proper understanding of the construction of the bottom frame 13, which is complemental to the top frame 12, reference is best had to the disclosure of FIGS. 2, 7 and 10. Receiving as it does, the weight of the several cell units 10, this bottom frame 13 is provided with cell-receiving shoulders along the sides thereof, which shoulders are substantially dimensioned, particularly as to thickness. These shoulders extend interiorly along the lower extent of the lengths of the side members 13A of these bottom frames 13, as indicated generally at 13C. As is evident from FIG. 2, bottom frame 13, in manner generally similar to top frame 12, is comprised of paired side members 13A, 13A, spaced from each other and joined together by end members 13B, 13B. Separators 13D, 13D, comprised as molded parts of frame 13, extend between the spaced side members 13A, 13A. These latter have raised central extensions 13D' (see FIG. 10). The separators extend upwardly, in assembly, for a short distance between the adjacent cell units 10, 10, and thus contribute effectively, along with the internal shoulders 13A, to position the assembled active cell units. These separators thus tend to immobilize the units 10 while in assembly and during service.

Consideration of FIGS. 2 and 10 is helpful in understanding thoroughly the cross-sectional configuration of the bottom frame 13, with particular reference to the side members 13A, 13A thereof. The fundamentally L-shaped section is again resorted to here, primarily for its qualities of adequate strength and ease in molding. However, we here adopt a cross-section which is somewhat more complicated than is the section of the top frame 12 as evidenced in the cross-section of the side members 12A, 12A thereof. And while, with the top frame 12 properly oriented with respect to the grouped and assembled active cell units 10, this top frame member 12 is of inverted L-shaped cross-section, the contrary exists with respect to the properly oriented bottom frame 13. For here, there are provided the vertical flanges or lips 13F, 13F, which are upstanding and encompass the bottom portions of the sides 10F of the assembled cell units 10G.

The internal shoulders 13C of the sides of the bottom frame, in turn, are comprised of a horizontal bed 13G, for the reception of the bottoms 10H of the active cell units 10, together with a load-carrying vertical web 13H, all as best disclosed in FIG. 10. Functionally, these shoulders 13C, comprised of horizontal web 13G and vertical web 13H (themselves providing angular or L-shaped configuration when viewed in cross-section) serve as solid horizontal webs of the side arms 13A. We thereby achieve both a saving of material in the space 13J (FIG. 10) between the lips and webs 13F, 13H, and, as well, effective economies both in cost of materials and in weight of the bottom frame. This saving in material may be readily accomplished, without difficulty, in the molding process. No difficult die problem is posed thereby. Here again, a suitable material is required, displaying adequate physical properties of strength, hardness, rigidity and the like, coupled with light weight and resistance to attack both by acid and rust. As heretofore stated, polystyrene is found to be most effective for this purpose.

From a consideration of FIG. 2 it will be seen that, to initially assemble a battery, it is required only to decide upon its voltage and output ratings. Then active cell units 10 are assembled in desired number and configuration. This will satisfy not only the output ratings of the completed battery, but as well, the dimensions and configuration thereof.

Jumpers or connectors 11 are applied to the cell units. The cell units are positioned on the bottom frame 13. Separators 13D of frame 13 serve to ensure proper positioning of the cell units 10. The top frame 12 is then placed over the tops of the assembled cell units 10, resting thereon by the sides 12A, 12A, ends 12B, 12B and central web 12C.

It remains to removably tie together the top frame 12 and bottom frame 13, in clamping relation about the assembled cell units 10. We accomplish this by providing during the molding process, external boss-like protuberances 12F along the lengths of the side arms 12A, 12A. These bosses 12F are provided, in desired suitable manner, with central bores 12G. In the bottom frame 13 we provide similar bosses 13K along the lengths of the side arms 13A. And these bosses 13K are provided with central bores as at 13L, preferably for only a portion of their vertical extent, which are threaded.

Elongated screw-headed bolts 14 pass through the bosses 12F and thread, by means of threaded ends, 14A, into the complemental threaded bores 13L provided in the bosses 13K of the bottom frame. By properly turning down these bolts 14, the composite open frame, comprised of top and bottom frame units 12 and 13, is compressed tightly about the assembly of active cell units 10.

For ready mounting of our battery in the automobile or other equipment which it is to service we provide additional external bosses 12H and 12J, each centrally bored, along the sides and ends of the top frame 12. These are so positioned as to permit almost universal suspension or mounting of the assembled battery upon the automobile or other installation, the engagement therewith being achieved through top frame 12. Bolts, screws, or other modes of installing are conventionally resorted to.

In our battery, we form the bolts 14 of some suitable plastic, other than of polystyrene. A suitable soft, flexible and pliable plastic, notably polyethylene, effectively responds to our requirements. This material is light in weight. Additionally, and of great import, we find that polyethylene bolts 14 will not stick or fuse to the polystyrene bosses 12F and 13K with which they thread or through which they pass, even under the action of heat, grease, gasoline, acid, water and oil as is usually found near an internal combustion engine. Thus, our battery may be disassembled readily and without difficulty even after years of use, and a spent cell thereupon easily and quickly replaced.

Figure 6:
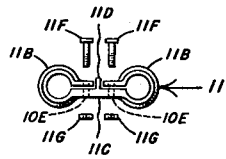
FIG. 6 is a plan view of a disassembled post connector as employed in our battery.

To facilitate this ready replacement as and when required, we prefer to make the lead connectors or jumpers 11 of a single strip of lead, as perhaps best shown in FIG. 6. Properly sectioned to provide adequate strength with minimum metal, and readily seating in intimate contact about the terminal posts 10C and 10D, jumper 11 is shaped to provide what may be termed re-entrant ends 11A with paired eyes 11B. These eyes are separated by a central spacing web 11C to an extent equal to the spacing which is established between adjacent terminal posts of neighboring cell units 10, when these are in assembly. In making the connector we provide a centrally disposed and upstanding centering web 11D. The ends 11A of lead strip 11 usually seat against web 11D as the connector is tightened onto the two adjacent posts of adjacent cells by way of lock-down bolts 11F and related nuts 11G, each formed of iron or other suitable material.

With bolts 11F backed off slightly it will be seen to be a matter of but a moment to knock down the connectors 11 onto the related battery posts 10C, 10D and then to tighten down the bolts 11F into removably fast assembly. On the contrary, when it is desired to remove a defective cell, it takes only a moment to back off the bolts 14 in order to release them from the bottom frame 13. The top frame 12 is then removed in its entirety, together with the bolts 14, from its encircling engagement about the tops of the cell units 10. And the related battery connectors 11, defective cell and the neighboring cells are then disengaged. This is accomplished by backing off the bolts 11F and thereupon knocking off the connectors. The defective cell is then removed, all without disturbing the remaining cells. A fresh cell unit is then substituted. The connectors 11 are replaced and tightened down. And top frame is restored to its position over the tops of the cell units 10, bolts 14 tightened down into the bosses 13K of the bottom frame 13 and the battery, thus conditioned, is ready for restoring in its carrier or the like on the automobile or other place of mounting.

It is apparent from the foregoing that our new construction makes possible a replacement of a spent cell all in minimum time and with minimum effort and cost. Moreover, the battery is light in weight, is sturdy and of long useful life. It is practically fool-proof in assembly, in operation, and in replacement of cell units. Only minimal technical knowledge is required in the replacement operation.

The dealer, both at jobbing and at retail level, is required to make only limited investment both in the units themselves, and in the space required to store the same. Actually, he need carry only a supply of fresh cell units, the connectors therefor, and along therewith, a comparatively small supply, properly nested atop each other, of top and bottom frames which are of a comparatively few different sizes and configurations. These, together with the bolts, are all that are required to quickly assemble and customize a complete battery, as and when required. For battery servicing and repair it is ordinarily required only that fresh cell units be available.

The incompatibility of the polystyrene and polyethylene plastics relative to each other is advantageously employed in our invention, to insure that the assembly bolts may be readily removed from the bottom frame of the battery after long periods of use, and these under extremes of adverse operating conditions. We find that these two materials simply do not stick together nor freeze in the lock-down threads even under the most rigorous and adverse conditions encountered in actual use. Moreover, the acid-proof and rust-proof qualities of these materials effectively avoids other undesirable problems heretofore confronting the industry.

In our battery adequate ventilation is insured at all times. Frothing and loss of electrolyte is minimal. Thus highly advantageous operation characteristics are observed.

All the foregoing, as well as many other highly practical advantages, attend the practice of our invention.

It is apparent from the foregoing that many possible embodiments may be made of our invention. And since, as well, many changes may be made in the embodiment set forth in the foregoing, we desired it to be understood that all matter described herein is to be interpreted as simply illustrative, and not as comprising limitations.

We claim as our invention:

1. A dismantleable electric storage battery assembly comprising in combination, a selected plurality of separate and independent cell units, each of said units being inwardly and downwardly tapered from top to bottom thereof along the sides and ends of the same; top and bottom open molded plastic frames encompassing said cell units as a group, said bottom frame including spaced parallel separator portions extending between spaced parallel side members thereof and serving to receive adjacent cell units and separate the latter from each other to provide ventilating air space therebetween and facilitate initial positioning of the cells; and lock-down means interconnecting said top and bottom frames for making said frames removably fast to each other and clamping the cell units therebetween, said top and bottom frames being substantially L-shaped in cross-section, thereby providing horizontally and inwardly extending shoulders which serve both to maintain the cell units in assembled relationship and, together with said separator portions, to properly position the units relative to each other with ventilating air space therebetween.

2. A readily dismantleable electric storage battery assembly flexibly adapted to respond to desired dimensioning, configuration, and electrical voltage and output ratings, and comprising, in combination, a plurality of active cell units physically separated from each other; removable connectors electrically connecting the cell units together in desired relationship; top and bottom open polystyrene frames for said cell units, and being provided with lip portions for engaging the cell units in assembled relationship and having peripheral bosses bored therethrough for suitable clamping elements; said bottom frame including separator means for maintaining said cell units in spaced relation at the bottoms thereof to assure adequate ventilation between the same; and headed bolts extending through said peripheral bosses of one said frame and removably threading into like bosses molded on the other said frame.

3. A readily dismantleable electric storage battery assembly comprising, in combination, a selected plurality of separate active cell units, connector-joined in desired circuitry; top and bottom open polystyrene frames therefor having lip portions adapted to extend about and engage for short extent the sides of the assembled active cell units, said bottom frame including spaced parallel upstanding separator portions serving to fit between adjacent cell units and separate the same from each other, both of which frames are provided with outwardly disposed bosses for the reception of fastening devices; and lock-down polyethylene bolts extending through the bosses of one said frame and threading into the bosses of the other frame for clamping the cell units between said frame members, said frames additionally including bosses for the removable reception of means for mounting the battery assembly on a suitable support.

References Cited in the file of this patent

UNITED STATES PATENTS

| | | |
|---|---|---|
| 1,304,588 | Monahan | May 27, 1919 |
| 1,362,554 | Balzano | Dec. 14, 1920 |
| 1,486,434 | Holden | Mar. 11, 1924 |
| 1,515,279 | Sato | Nov. 11, 1924 |
| 2,783,293 | Fritsch | Feb. 26, 1957 |
| 2,784,245 | Coleman et al. | Mar. 5, 1957 |

FOREIGN PATENTS

| | | |
|---|---|---|
| 537,915 | Canada | Mar. 5, 1957 |
| 657,711 | France | Jan. 16, 1929 |

OTHER REFERENCES

"Modern Plastics," vol. 30, No. 7, March 1953, pages 77, 78 and 171.